(12) United States Patent
Jeon

(10) Patent No.: US 8,385,254 B2
(45) Date of Patent: Feb. 26, 2013

(54) METHOD FOR SHARING WIRELESS CHANNEL RESOURCE IN COMMUNICATION SYSTEM

(75) Inventor: Beom Jin Jeon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 12/681,369

(22) PCT Filed: Oct. 8, 2008

(86) PCT No.: PCT/KR2008/005902
§ 371 (c)(1), (2), (4) Date: Apr. 1, 2010

(87) PCT Pub. No.: WO2009/048257
PCT Pub. Date: Apr. 16, 2009

(65) Prior Publication Data
US 2010/0232414 A1    Sep. 16, 2010

(30) Foreign Application Priority Data
Oct. 8, 2007   (KR) .................. 10-2007-0101029

(51) Int. Cl.
*H04B 7/212* (2006.01)
*H04W 4/00* (2009.01)
*H04J 3/00* (2006.01)

(52) U.S. Cl. ......... 370/322; 370/329; 370/336; 370/348

(58) Field of Classification Search .................. None
See application file for complete search history.

(56) References Cited

U.S. PATENT DOCUMENTS

| | | | |
|---|---|---|---|
| 2005/0025265 | A1 | 2/2005 | D'Amico et al. |
| 2005/0286426 | A1 | 12/2005 | Padhye et al. |
| 2007/0097853 | A1 | 5/2007 | Khandekar et al. |
| 2007/0274206 | A1* | 11/2007 | Habetha et al. ............ 370/222 |
| 2007/0280157 | A1* | 12/2007 | Kwon et al. ............... 370/329 |

FOREIGN PATENT DOCUMENTS

| | | |
|---|---|---|
| JP | 11-163884 | 6/1999 |
| JP | 2003-284128 | 10/2003 |
| JP | 2005323375 | 11/2005 |
| JP | 2007166488 | 6/2007 |
| WO | 03075515 | 9/2003 |
| WO | 2007093653 | 8/2007 |

* cited by examiner

*Primary Examiner* — Andrew Chriss
(74) *Attorney, Agent, or Firm* — Lee, Hong, Degerman, Kang & Waimey

(57) ABSTRACT

A method for sharing a channel in a communication system is disclosed. The method includes receiving scheduling information including information about a channel time reserved by other user devices, and transmitting data through the reserved channel time if a result of performing scanning in the reserved channel time indicates that no interference occurs, wherein the communication system performs communication using beam signals which are directional. If the signals are highly directional, the channel sharing method enables a plurality of user devices to share a channel, thereby increasing the efficiency of channel use.

4 Claims, 6 Drawing Sheets

(a) access (b) NO access (a) Interference Detection by D (b) Termination of Communication (a) Interference Detection by B (b) Report of Interference Detection (c) Termination of Communication

METHOD FOR SHARING WIRELESS CHANNEL RESOURCE IN COMMUNICATION SYSTEM

CROSS-REFERENCE TO RELATED APPLICATIONS

This application is the National Stage filing under 35 U.S.C. 371 of International Application No. PCT/KR2008/005902, filed on Oct. 8, 2008, which claims the benefit of earlier filing date and right of priority to Korean Application No. 10-2007-0101029, filed on Oct. 8, 2007.

TECHNICAL FIELD

The present invention relates to a communication system, and more particularly, to a method for sharing a wireless channel resource in a communication system.

BACKGROUND ART

Recently, Bluetooth and wireless personal area network (WPAN) technologies have been developed which can transmit and receive audio and video data between devices by forming a wireless network between a relatively small number of digital devices in a limited space such as a home or a small-size office. The WPAN may be used to exchange information between a relatively small number of digital devices that are relatively close to one another and enables the digital devices to communicate with each other at low power and low costs.

If communication is performed using wireless technologies, it is possible to remove lines such as cables used to connect the devices. Moreover, data information can be directly exchanged between the devices through wireless network communication between the devices.

Generally, in order to share a time resource for transmitting and receiving data via wireless communication, a time division multiple access (TDMA) scheme is used. A certain interval is reserved according to users and data is transmitted and received in the reserved time interval. Especially, in data transmission and reception in which quality of service (QoS) is regarded as important, interference and collision between data can be avoided through the TDMA scheme.

However, since a channel time which can be used in the TDMA scheme is limited, if the channel time is completely allocated to user devices, it is impossible to allocate the channel to additional user devices.

DISCLOSURE

Technical Problem

An object of the present invention devised to solve the problem lies in providing a method for sharing a channel in a communication system. Another object of the present invention is to provide a method for stopping communication when interference is detected during channel-shared communication.

Technical Solution

In accordance with an aspect of the present invention to achieve the above objects, a method for sharing a channel in a communication system including a user device comprises receiving information about a first channel time reserved by other user devices from a coordinator, and performing data communication in a second channel time reserved for other user devices to use if a result of performing scanning in the first channel time indicates that no interference occurs, wherein the communication system performs communication using beam signals which are directional.

The beam signals may be mmWave signals.

The method may further include repeatedly performing scanning in the first channel time while performing the data communication.

The method may further include terminating the data communication upon detecting data transmission and reception of other user devices while performing the data communication.

The method may further include terminating the data communication upon receiving the signal indicating that interference has occurred from at least one of other user devices and the communication system while performing the data communication.

Advantageous Effects

According to the channel sharing method, communication can be performed even at a reserved channel time. Moreover, a limited wireless resource can be efficiently used by sharing a channel. When the channel sharing method is applied to communication having a strong directional characteristic, effect thereof can be further increased.

Furthermore, even if interference occurs while communication is performed by sharing a channel, the communication is effectively terminated to prevent interference, thereby improving communication performance.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. Terms used above and/or below may be replaced with other ones. For example, a user device may be modified to a device, a user equipment, a station, etc., and a coordinator may be modified to a control device, a controller, a coordinating device, a coordinating (or control) station, a piconet coordinator (PNC), etc. A data packet may refer to transmitted and received information, such as a message, traffic, a video/audio (A/V) data packet, and a control data packet, and is not limited to a specific data packet.

Devices performing communication in a communication system include all digital devices, such as a computer, a personal digital assistant (PDA), a notebook computer, a digital TV, a camcorder, a digital camera, a printer, a microphone, a speaker, a headset, a barcode reader, a display, a cellular phone, etc.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

The following embodiments show examples in which a technical characteristic of the present invention is applied to a wireless video area network (WVAN), which is a kind of a wireless network. WVAN is a wireless network using wireless HD (WiHD) technique which can provide throughput of 4.5 Gbps or more so as to transmit a 1080p A/V stream without compression at distances of up to about 10 m using a frequency band of 60 GHZ.

Figure 1:
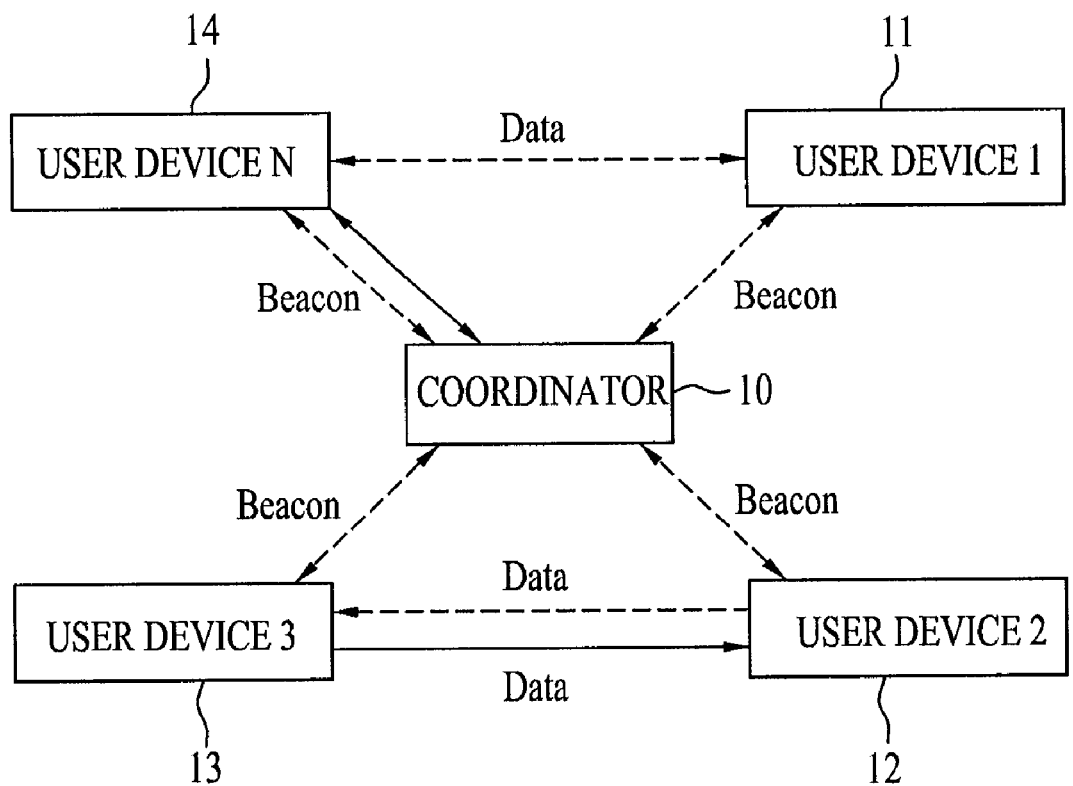
FIG. 1 is a view explaining an exemplary WVAN comprised of a plurality of user devices.

FIG. 1 is a view explaining an exemplary WVAN comprised of a plurality of user devices.

WVAN is a network constructed to exchange data between user devices located in a certain space. WVAN is comprised of two or more user devices 10 to 14 and one of the user devices operates as a coordinator 10. The coordinator 10, in constructing a wireless network between user devices, is a device which allocates a wireless resource and performs a scheduling function in order to share the wireless resource without collision between a plurality of user devices. The coordinator 10 allocates a wireless resource and performs scheduling to periodically transmit a message including scheduling information to the user devices. Hereinafter, the message is referred to as a beacon.

The coordinator can transmit and receive, as a usual user device, data through at least one channel as well as allocates resources so that the user devices constituting the network can perform communication. The coordinator also can implement clock synchronization, network association, bandwidth resource maintenance, and the like.

WVAN supports two physical layers, a high-rate physical layer (HRP) and a low-rate physical layer (LRP). HRP is a physical layer supporting a data transmission rate over 1 Gb/s and LRP is a physical layer supporting a data transmission rate of a few Mb/s.

HRP is highly directional and is used to transmit an isochronous data stream, asynchronous data, a medium access control (MAC) command, and A/V control data, through unicast connection. LRP supports a directional or omni-directional mode and is used to transmit a beacon, asynchronous data, and a MAC command including the beacon, through unicast connection or broadcast.

An HRP channel and an LRP channel share a frequency band and are discriminated by a time division multiplexing (TDM) scheme. HRP uses four channels of a bandwidth of 2.0 GHz at a frequency band of 57 to 66 GHz and LRP uses three channels of a bandwidth of 92 MHz.

Figure 2:
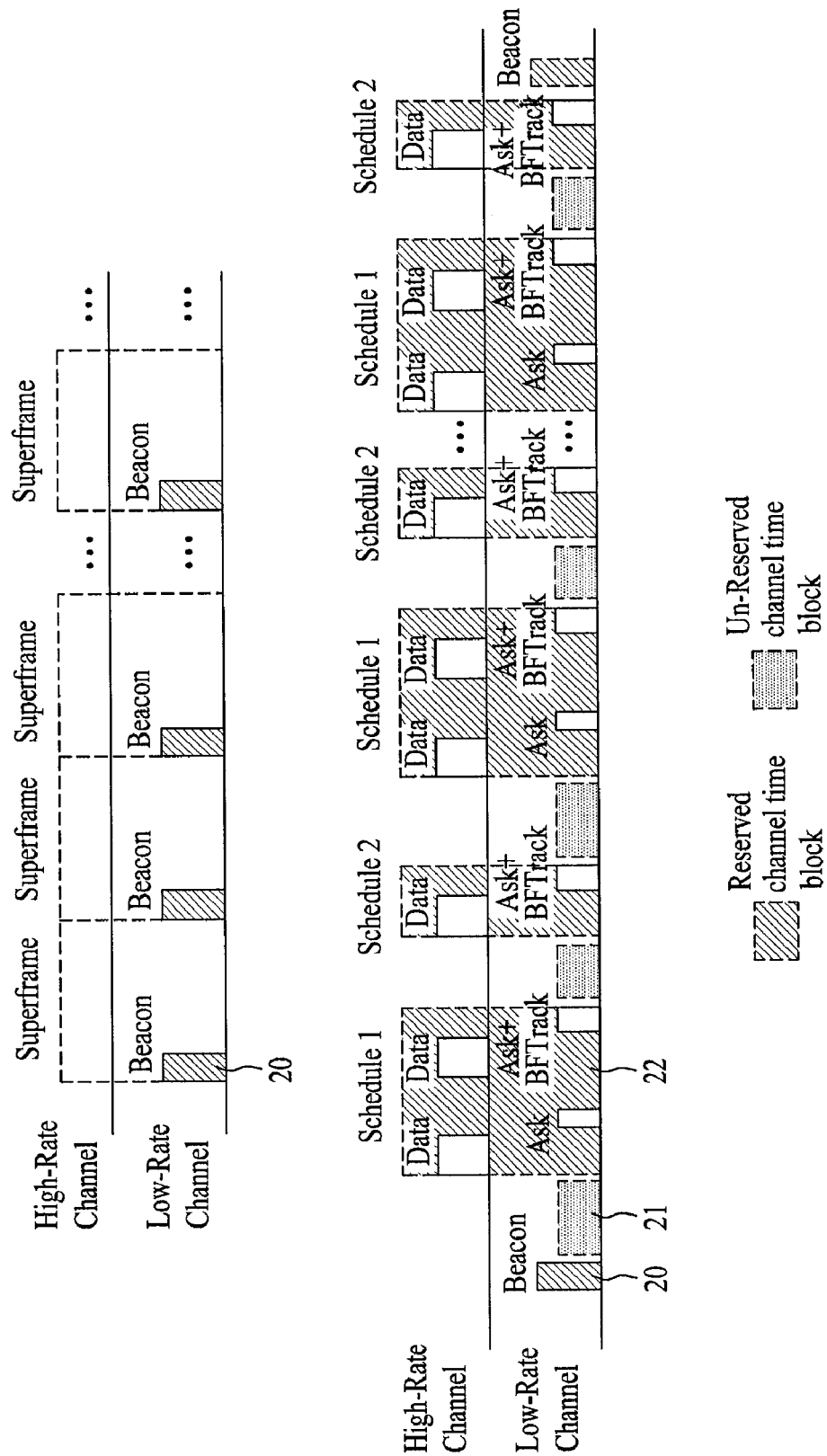
FIG. 2 is a view explaining an exemplary superframe structure used in a WVAN.

FIG. 2 is a view explaining an exemplary superframe structure used in a WVAN.

Referring to FIG. 2, each superframe includes a region in which a beacon 20 is transmitted, a reserved channel time block 22, and an unreserved channel time block 21. Each channel time block (CTB) is time-divided into an HRP region in which data is transmitted through an HRP and an LRP region in which data is transmitted through an LRP.

The beacon 20 is periodically transmitted by a coordinator. An introductory part of every superframe can be discerned through the beacon.

Generally, mutual collision in wireless communication is minimized by carrier sense multiple access (CSMA). CSMA, which is a listen-before-talk scheme, starts communication when a communicating entity does not exist as a result of determining whether there is a communicating entity through a corresponding resource before starting communication. Since this method can not fully avoid collision, in video transmission for example, in which QoS is important, it is desirable to access a channel by previously allocating time using TDMA whenever connection is made.

However, since a channel time allocated is limited, if a channel time is reserved by one or more user devices in TDMA-based communication, other user devices can not transmit and receive data during that channel time. Hereinafter, a method for sharing a channel by one or more user devices according to an exemplary embodiment of the present invention will be described.

According to this embodiment, even at a channel time reserved by another user device, data is transmitted and received through the reserved channel time if no signal is detected as a result of detecting a signal by scanning the channel time. Namely, if a scanning result indicates that no signal is detected even though another user device reserves a channel time and actually uses the channel time, communication can be performed by accessing that channel time. Hence, a limited communication resource can be efficiently used.

When a user device reserving a channel time does not actually perform communication during that channel time or user devices do not generate mutual interference or collision owing to spatial locations of the user devices or physical characteristics of a signal, a plurality of user devices can share the same channel time. Especially, when beam signals are highly directional as in mm-wave transmission, if directions of the beam signals differ, a channel can be used without collision even though user devices simultaneously access the channel.

Meanwhile, a desired multiple access method may differ according to a service provided by a user device or a characteristic of transmitted or received data. For example, for a service such as video transmission in which QoS is important, TDMA which can ensure less interference and less collision is used to reserve and utilize a channel time. For a service which does not generate any substantial problem for intermittent communication such as file transmission, CSMA is used to access a channel. Even in this case, however, this embodiment permits an opportunity to access a channel time which has already been allocated by TDMA.

Figure 3:
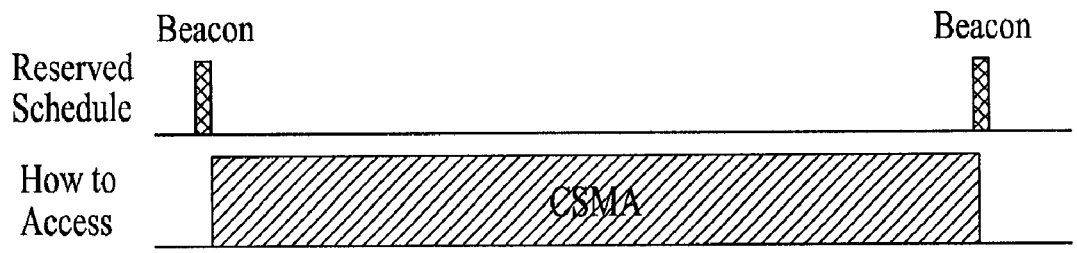
FIG. 3 is a view explaining a channel access method when no channel time is reserved in a superframe.

FIG. 3 is a view explaining a channel access method when no channel time is reserved in a superframe.

A user device can obtain scheduling information about a corresponding superframe through a beacon received from a coordinator. The scheduling information includes information about a channel time reserved by user devices which reserve a partial channel time according to TDMA. If the scheduling information indicates that a channel time is not reserved within a corresponding superframe, the user device can transmit and receive data by accessing the whole channel time using CSMA as illustrated in FIG. 3.

Figure 4:
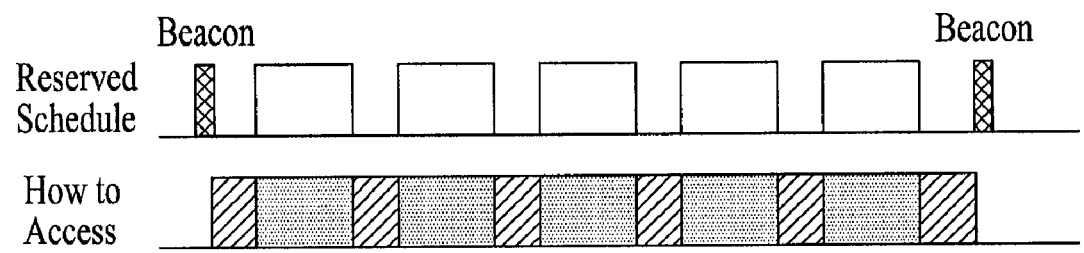
FIG. 4 is a view explaining a channel sharing method when a reserved channel time is present in a superframe according to an exemplary embodiment of the present invention.

FIG. 4 is a view explaining a channel sharing method when a reserved channel time is present in a superframe according to an exemplary embodiment of the present invention. If scheduling information indicates that a reserved channel time is present within a corresponding superframe, the user device performs communication using different access methods with respect to a reserved channel time and an unreserved channel time. A general CSMA method is used to access the unreserved channel time as in FIG. 4 and a channel sharing method according to the present invention is used to access the reserved channel time, thereby transmitting and receiving data.

Figure 5:
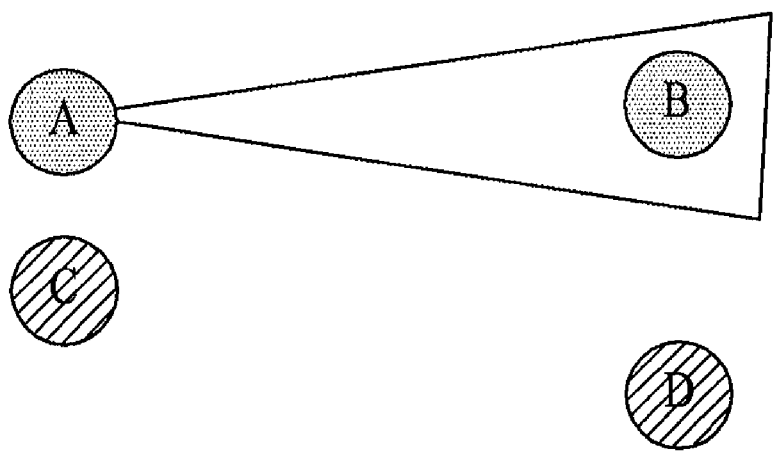
FIGS. 5(a) and 5(b) are views explaining a channel sharing method according to an exemplary embodiment of the present invention.
Figure 5:
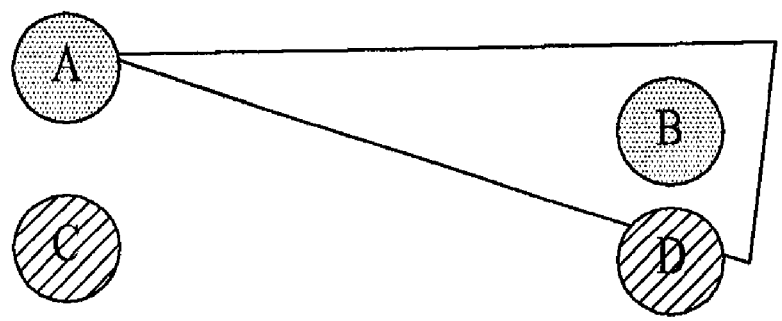

FIGS. 5(a) and 5(b) are views explaining a channel sharing method according to an exemplary embodiment of the present invention.

In this embodiment, a method is provided for sharing a channel by accessing a channel time reserved by another user device.

First, assuming that user devices C and D can confirm a reserved channel time through scheduling information and desire to transmit and receive data by accessing even a channel time reserved by other user devices A and B, the user devices C and D scan the reserved channel time during a specific time before determining use of the reserved channel time.

When using the reserved channel time through such a scanning operation, whether interference is to occur due to a data signal transmitted and received by other user devices is confirmed. That is, whether signal beams of the user devices A and B are overlapped or whether data traffic is detected is confirmed.

If no signal is detected as illustrated in FIG. 5(a), even the user devices C and D which have not reserved the channel time can attempt access. However, if a signal is detected due to data transmission and reception of the user devices A and B as illustrated in FIG. 5(b), access is not attempted and the above process is repeated with respect to another channel time.

When the user devices C and D which have not reserved the channel time as illustrated in FIG. 5(a) communicate through the reserved channel time, the user devices C and D may further transmit identifier (ID) information which can identify a user device while transmitting data. If data including ID information is transmitted and received, the ID information can be used when the user devices A and B which detect interference during communication transmit a communication stop request signal to at least one of the user devices C and D which have caused the interference.

When communication is performed two or more times through one channel time according to the above-described channel sharing method, it is desirable to implement repeated scanning. Since the location of each user device is variable and communication environments also have various parameters, even though a signal is not detected by other communication entities at the moment when performing scanning for connection, interference or collision between data may occur subsequently during communication due to other communication entities. It is desirable that the entities performing such repeated scanning are user devices which access a corresponding channel time by performing scanning without reserving the channel time.

Hereinafter, a method for terminating communication when interference or data collision occurs subsequently while communication is performed two or more times through the same channel time according to an exemplary embodiment of the present invention will be described.

FIGS. 6(a) and 6(b) are views explaining a method for terminating communication when an interference signal is subsequently detected according to an exemplary embodiment of the present invention.

User devices C and D which use a channel by performing scanning even in a reserved channel time repeatedly perform scanning during transmission and reception of data, i.e., during communication as described above. During such communication, the user devices C and D can detect interference caused by user devices A and B which are communicating using the same channel time. Upon detecting the interference, the user devices C and D stop communication.

FIGS. 7(a), 7(b), and 7(c) are views explaining a method for terminating communication when an interference signal is subsequently detected according to another exemplary embodiment of the present invention.

User devices A and B which reserve a channel time and perform communication during the reserved channel time also can detect, during communication, interference caused by other user devices C and D. If the user devices C and D transmit and receive data including ID information, the user devices A and B can confirm that which of the user devices C and D causes the interference.

The user devices A and B which have detected interference during communication can transmit a communication stop request signal to at least one of the user devices C and D which have caused the interference. Moreover, the user devices A and B which have detected the interference during communication can report the occurrence of interference to a coordinator of a communication system. The coordinator which has received the report transmits a communication stop request signal to at least one of the user devices C and D which have caused the interference. Upon receiving the communication stop request signal by other user devices or the coordinator, the user devices C and D stop communication.

Figure 6:
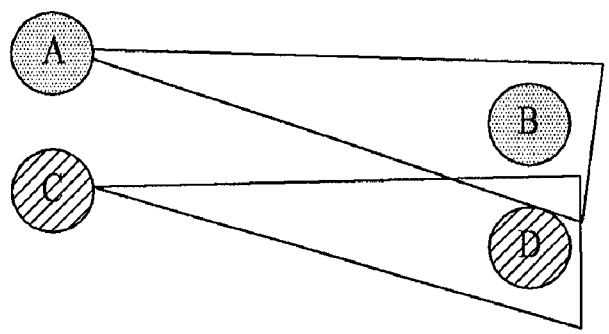
FIGS. 6(a) and 6(b) are views explaining a method for terminating communication when an interference signal is subsequently detected according to an exemplary embodiment of the present invention.
Figure 6:
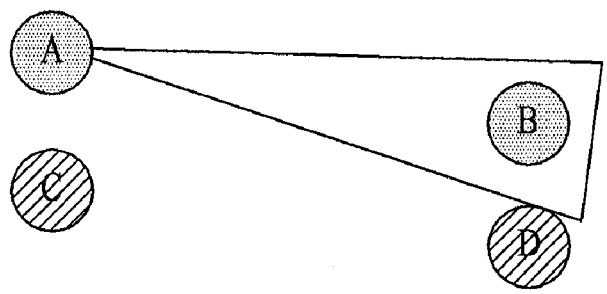
Figure 7:
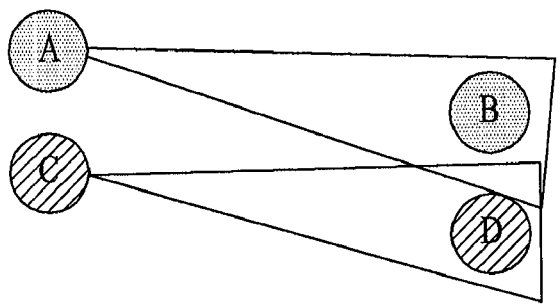
FIGS. 7(a), 7(b), and 7(c) are views explaining a method for terminating communication when an interference signal is subsequently detected according to another exemplary embodiment of the present invention.
Figure 7:
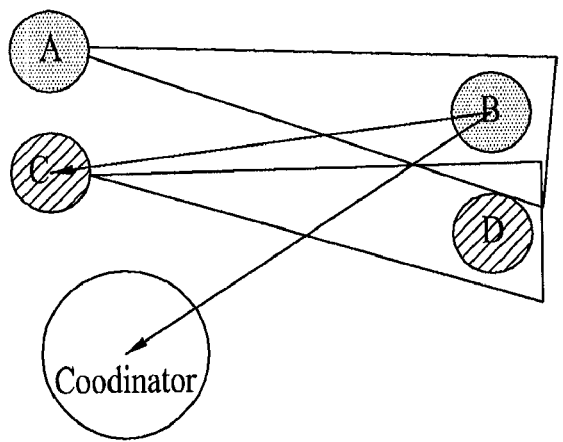
Figure 7:
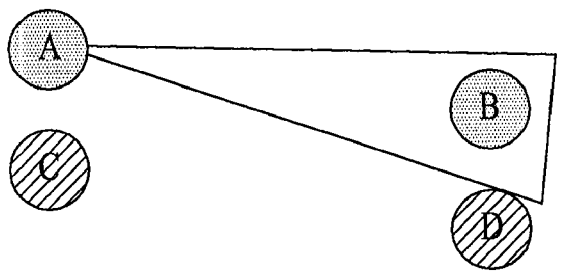

Further, in FIG. 6 and FIG. 7, the user devices, for example, A and B which perform communication sensitive to QoS may use a channel time by reservation, and the user devices, for example, C and D which are less sensitive to QoS may use a reserved channel time through scanning even in a channel time reserved by other user devices, thereby increasing an effect of the user devices.

Meanwhile, if QoS of a service provided by user devices which have reserved a channel time is an important element, channel sharing may be scheduled to be prohibited.

It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method for sharing a channel in a communication system. Especially, the present invention is applicable to wireless devices using highly directional beams such mmWave.

The invention claimed is:

1. A method for sharing a channel time in a communication system including a plurality of user devices, the method comprising:
   receiving, from a coordinator, reservation information indicating whether a first channel time is reserved by other user devices;
   performing a first scan when the first channel time is reserved by one or more of the other user devices, wherein the first scan is performed of the first channel time before determining whether to use the first channel time;
   performing data transmission or reception in the first channel time if a result of the first scan indicates that no interference occurs,
   performing a second scan of the first channel time while the data transmission or reception is performed in the first channel time; and
   terminating the data transmission or reception in response to a termination request received from the coordinator if a result of the second scan of the first channel time indicates that interference occurs, the termination request generated by the coordinator when the occurrence of interference is reported from the other devices.

2. The method of claim 1, further comprising terminating the data communication in response to a termination request received from the other user devices that have detected the occurrence of interference.

3. The method of claim 1, wherein performing data transmission or reception comprises transmitting data together with identifier information.

4. The method of claim 1, wherein the reservation information is acquired via scheduling information at a beacon interval.

* * * * *